(12) United States Patent
Keller

(10) Patent No.: US 10,238,041 B2
(45) Date of Patent: *Mar. 26, 2019

(54) SYSTEM AND METHOD FOR BALING AGRICULTURAL CROP MATERIAL

(71) Applicant: CNH Industrial America LLC, New Holland, PA (US)

(72) Inventor: Donald P. Keller, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 317 days.

This patent is subject to a terminal disclaimer.

(21) Appl. No.: 15/141,221

(22) Filed: Apr. 28, 2016

(65) Prior Publication Data

US 2016/0235008 A1 Aug. 18, 2016

Related U.S. Application Data

(62) Division of application No. 14/777,268, filed as application No. PCT/US2014/028894 on Mar. 14, 2014, now Pat. No. 9,351,444.

(Continued)

(51) Int. Cl.
*A01F 15/04* (2006.01)
*A01F 15/14* (2006.01)
(Continued)

(52) U.S. Cl.
CPC .............. *A01F 15/14* (2013.01); *A01F 15/04* (2013.01); *A01F 15/042* (2013.01);
(Continued)

(58) Field of Classification Search
CPC ......... B65B 13/06; B65B 27/15; B65B 27/12; A01F 15/14; A01F 15/145; A01F 15/146;
(Continued)

(56) References Cited

U.S. PATENT DOCUMENTS

| 467,783 A | 1/1892 | Sailor |
| 3,796,150 A | 3/1974 | Van Doom et al. |

(Continued)

FOREIGN PATENT DOCUMENTS

| CN | 201563403 U | 9/2010 |
| CN | 201571359 U | 9/2010 |

(Continued)

OTHER PUBLICATIONS

PCT/US2014/028894, International Preliminary Report on Patentability, dated Sep. 15, 2015, 8 pages.

(Continued)

*Primary Examiner* — Jimmy T Nguyen
(74) *Attorney, Agent, or Firm* — Peter K. Zacharias; Patrick M. Sheldrake

(57) ABSTRACT

An agricultural baler. The agricultural bailer includes a baling chamber, a first plunger, a second surface opposing the first plunger, and a track assembly. The baling chamber includes a first wall and a second wall. Each of the first wall and the second wall includes a slot extending along a length of the baling chamber. The first plunger is moveable within the baling chamber and is configured to compress a compressible material into a bale. The second surface is configured to support the compressible material within the baling chamber. Each of the first plunger and the second surface includes a slot aligned with the slots of the first wall and the second wall. The track assembly includes a gated channel and is disposed within the slots of the first wall, the second wall, the first plunger, and the second surface such that the track assembly substantially surrounds the baling chamber.

6 Claims, 11 Drawing Sheets

Related U.S. Application Data

(60) Provisional application No. 61/794,914, filed on Mar. 15, 2013.

(51) Int. Cl.
*B65B 27/12* (2006.01)
*A01F 15/08* (2006.01)

(52) U.S. Cl.
CPC ...... *A01F 15/0825* (2013.01); *A01F 15/0875* (2013.01); *B65B 27/12* (2013.01); *A01F 2015/048* (2013.01)

(58) Field of Classification Search
CPC .............. A01F 15/042; A01F 2015/048; B30B 9/3007; B30B 9/30; B30B 9/3028; A01D 59/00
USPC ............. 100/3, 26, 179, 187, 220, 244, 264; 56/341, 343
See application file for complete search history.

(56) References Cited

U.S. PATENT DOCUMENTS

| | | | |
|---|---|---|---|
| 3,996,849 | A | 12/1976 | Del Jiacco |
| 4,150,613 | A | 4/1979 | Smee et al. |
| 4,391,186 | A | 7/1983 | Davis |
| 4,635,542 | A | 1/1987 | Sebelist et al. |
| 4,951,452 | A | 8/1990 | Lundahl et al. |
| 5,379,687 | A | 1/1995 | Moseley |
| 5,687,643 | A | 11/1997 | Felts et al. |
| 5,899,139 | A | 5/1999 | Dorman |
| 6,112,507 | A | 9/2000 | Mesmer |
| 6,457,405 | B1 | 10/2002 | Lippens et al. |
| 6,499,525 | B1 * | 12/2002 | Lai .................. B65B 13/06 100/26 |
| 6,633,798 | B2 | 10/2003 | Daniel et al. |
| 7,757,468 | B2 * | 7/2010 | Kastner ............ B65B 13/06 100/26 |
| 9,351,444 | B2 * | 5/2016 | Keller ............... A01F 15/14 |
| 2013/0042770 | A1 | 2/2013 | Verhaeghe et al. |

FOREIGN PATENT DOCUMENTS

| | | |
|---|---|---|
| DE | 4031695 A1 | 4/1992 |
| DE | 102008022970 A1 | 11/2009 |
| EP | 0009850 B1 | 4/1982 |
| FR | 2947480 A1 | 1/2011 |
| GB | 1537659 A | 1/1979 |
| WO | 9313988 A1 | 7/1993 |

OTHER PUBLICATIONS

PCT/US2014/028894, International Search Report, dated Jul. 22, 2014, 5 pages.

* cited by examiner

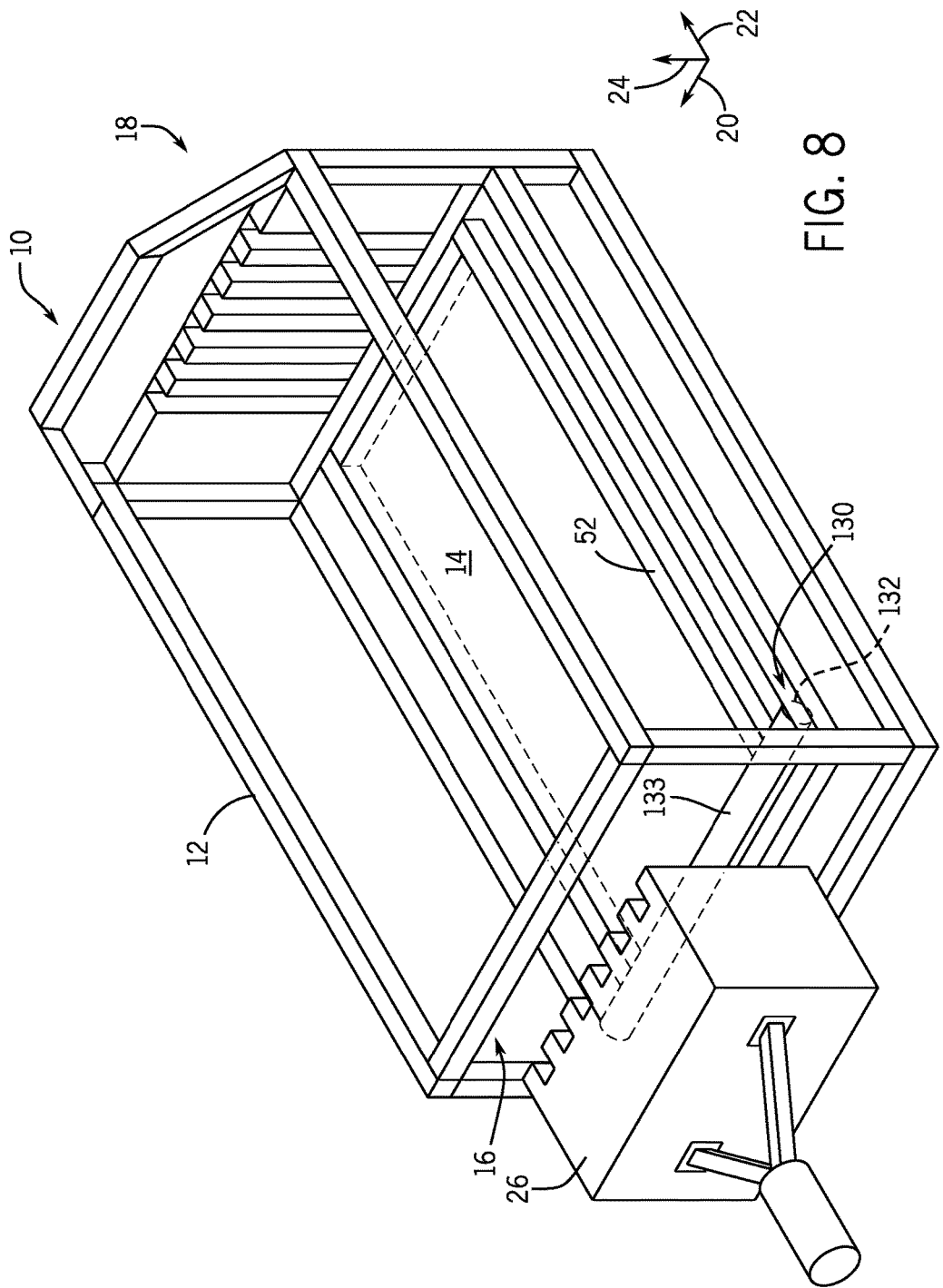

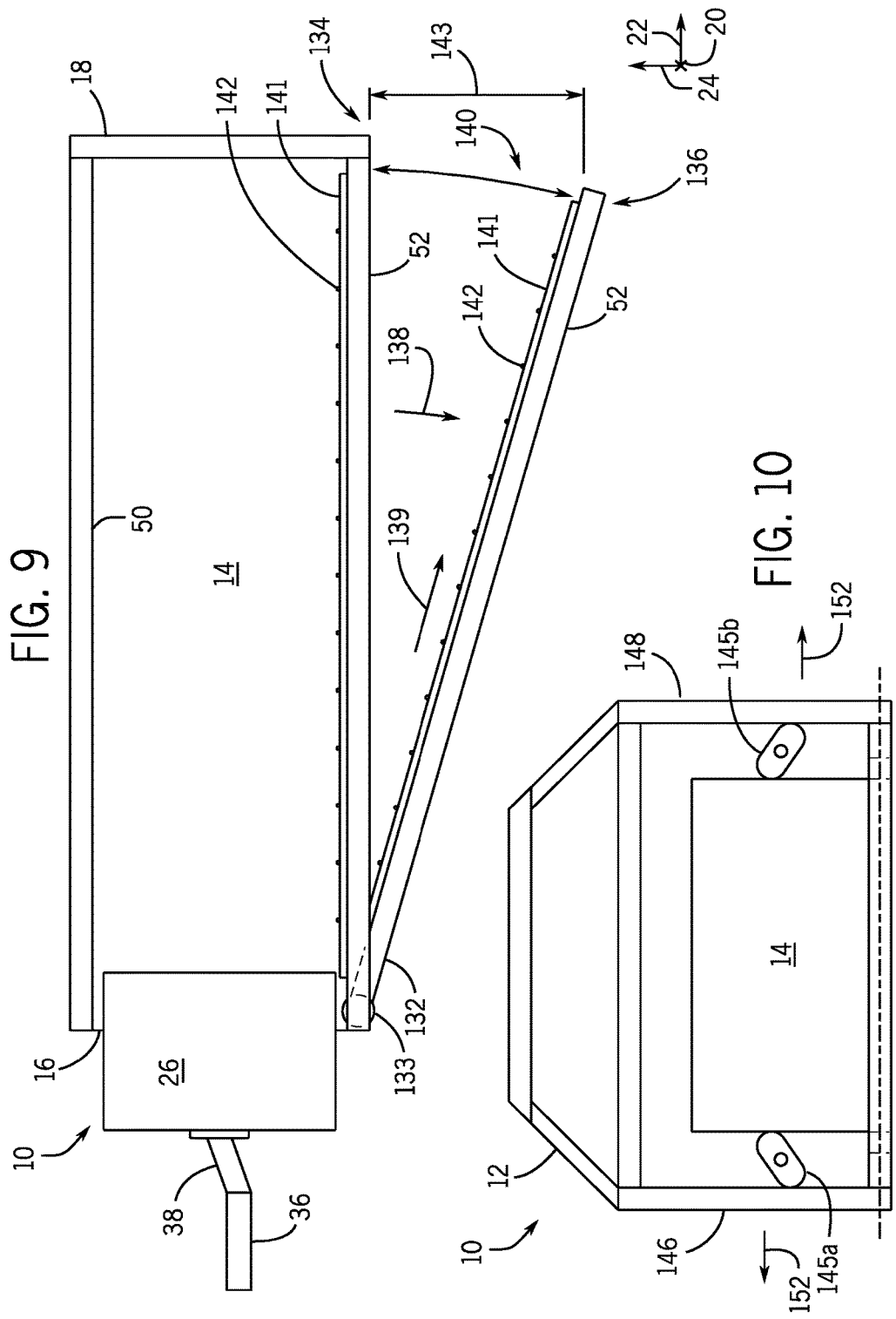

SYSTEM AND METHOD FOR BALING AGRICULTURAL CROP MATERIAL

CROSS REFERENCE TO RELATED APPLICATIONS

This application is a divisional of U.S. patent application Ser. No. 14/777,268, filed Sep. 15, 2015 and entitled "System and Method for Baling Agricultural Crop Material," which is a National Stage of International Application No. PCT/US2014/028894 filed Mar. 14, 2014, which claims the benefit of U.S. Provisional Patent Application No. 61/794,914, entitled "System and Method for Baling Agricultural Crop Material" and filed Mar. 15, 2013, the contents of each of which applications are incorporated herein by reference.

FIELD OF THE INVENTION

The present invention relates generally to the field of packaging compressible materials, and more particularly, to systems and methods for baling agricultural crop materials.

BACKGROUND OF THE INVENTION

Generally, balers are utilized to compress certain materials into rectangular bales to facilitate storage and handling of the material. Typically, the material is compressed within a baling chamber until the material forms a bale of a desired size. Such balers typically include a mechanism for wrapping and knotting twine around the material to maintain the compressed shape of the bale. Unfortunately, twine may be difficult to remove from the bale and may degrade the baled material. In addition, the tensile strength of twine may be too low to effectively bind compressed materials in certain applications.

SUMMARY OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, an agricultural baler disposed on a movable agricultural implement is provided. The baler includes a first plunger and a second plunger, positioned on an opposite longitudinal end of a baling chamber from the first plunger. The baler also includes a strap feeding assembly and a track assembly. The track assembly is disposed within a first slot formed on a first material-facing surface of the first plunger, a second slot formed on a second material-facing surface of the second plunger, a third slot formed on a third material-facing surface of a first wall of the baling chamber, and fourth slot formed on a fourth material-facing surface of a second wall of the baling chamber, wherein the first and second walls are positioned on opposite lateral or vertical sides of the baling chamber. The first plunger is configured to compress material within the baling chamber into a bale, and the strap feeding assembly is configured to propel an end of a strap through the track assembly, around the baling chamber, and into a sealing assembly configured to bind a first portion of the strap to a second portion of the strap to seal the strap into a loop around the bale within the baling chamber.

In another embodiment, an agricultural baler is disposed on a movable agricultural implement, and the baler includes a baling chamber configured to receive a compressible material. The baling chamber includes a first wall opposing a second wall, wherein each of the first wall and the second wall comprises a slot extending along a length of the baling chamber. A first plunger moveable within the baling chamber to compress the compressible material into a bale is provided. Additionally, a second surface opposing the first plunger is provided to support the compressible material within the baling chamber. Each of the first plunger and the second surface comprises a slot aligned with the slots of the first wall and the second wall. A track assembly comprising a gated channel is disposed within the slots of the first wall, the second wall, the first plunger, and the second surface such that the track assembly substantially surrounds the baling chamber.

In a further embodiment, a method for baling an agricultural crop material is provided. The method includes collecting the agricultural crop material in a baling chamber disposed on a movable agricultural implement and compressing the agricultural crop material into a bale via a first plunger. The method also includes controlling a density of the agricultural crop material via a second plunger positioned opposite the first plunger and feeding an end of a strap into a channel of a track assembly surrounding the baling chamber after the agricultural crop material is compressed into the bale. The method further includes propelling the end of the strap through the channel of the track assembly, directing the end of the strap into a sealing assembly, and sealing the end of the strap to a second portion of the strap within the sealing assembly to form a sealed loop surrounding the material.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 8 is a perspective view of an embodiment of a baling chamber having an ejection system;

FIG. 9 is a side cross-sectional view of an embodiment of a baling chamber having an ejection system;

FIG. 10 is a front cross-sectional view of an embodiment of a baling chamber having an ejection system;

DETAILED DESCRIPTION OF THE INVENTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments described herein relate to systems and methods for creating a bale of a desired size and/or density, and for strapping the bale using a relatively high-strength strap. In particular, a first plunger (e.g., a forward plunger) is configured to compress material within a baling chamber of a baler. The forward plunger and/or a second plunger (e.g., a rear plunger) are configured to accurately control the density of the bale. Additionally, various components may be provided within the baler to efficiently surround the bale with the strap and to seal the strap securely around the bale. The described embodiments may provide certain advantages over traditional baling systems. For example, the rear plunger may facilitate the formation of a bale of a particular size and/or density, and in some cases, the rear plunger may enable the formation of relatively high density bales. Moreover, the high strength and/or the large surface area of the strap may enable the strap to hold the bale in the desired size and shape more efficiently than twine, thereby facilitating easy storage and handling of the bale. Additionally, unlike twine, the strap may be easily removed from the bale and may reduce degradation to the baled material. Furthermore, certain components described herein (such as, for example, a track assembly) may enable efficient strapping of the bale while substantially reducing or eliminating twisting of the strap as the strap is applied to and sealed around the bale.

Figure 1:
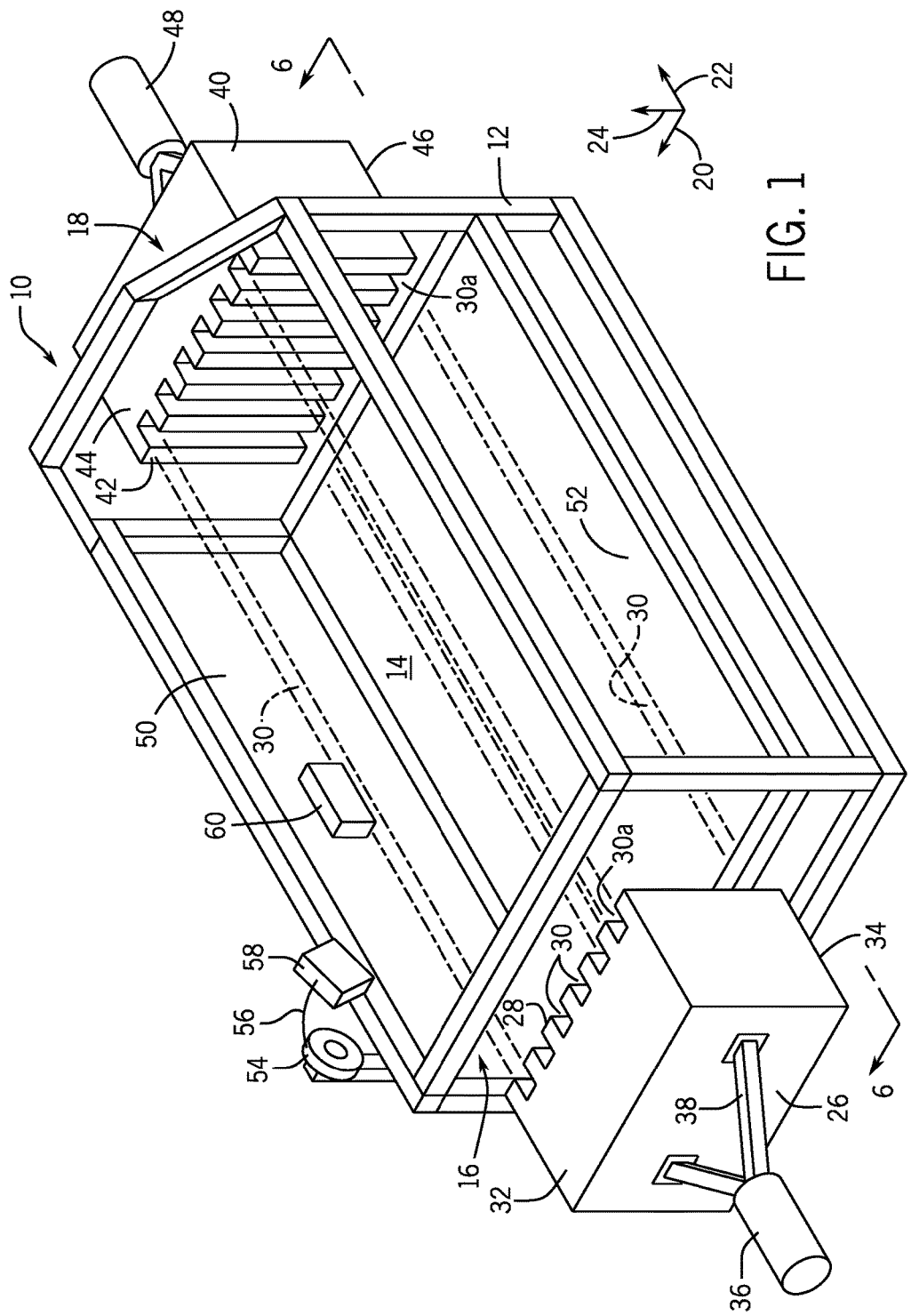
FIG. 1 is a perspective view of an embodiment of a portion of a baler having a forward plunger and a rear plunger.

FIG. 1 is a perspective view of an embodiment of a portion of a baler 10 configured to form and to strap rectangular bales of material (e.g., crop materials, such as hay, straw, grasses, silage, corn stalks, tobacco, cotton, biomass, etc.). In the illustrated embodiment, the baler 10 includes a frame 12 defining a baling chamber 14. The baling chamber 14 includes a first end 16 (e.g., forward end) and second end 18 (e.g., rear end), which may generally relate to the direction of travel of the baler 10. For example, the baler 10 may be coupled to a tow vehicle and pulled through a field, collecting and baling the crop material as the baler 10 travels through the field. When connected to the tow vehicle, the forward end 16 is proximal to the vehicle, while the rear end 18 is distal from the vehicle. The baler 10 may also be included in a self-propelled chassis, or may be part of a self-contained vehicle. The baler 10 may be further defined has having a lateral axis 20, a longitudinal axis 22, and a vertical axis 24. Although the illustrated embodiment includes a horizontal rectangular baler 10, it should be understood that the systems disclosed herein may be readily adapted for use in other types of bale presses, such as vertical bale presses. Additionally, although the illustrated embodiment includes a baler 10 configured to bind the bale around the lateral axis 20, in other embodiments the baler 10 may be configured to bind the bale around the longitudinal axis 22 or the vertical axis 24.

In the baler 10 of FIG. 1, the material is compressed within the baling chamber 14 by a forward plunger 26. In the illustrated embodiment, the forward plunger 26 includes a material-facing surface 28 having multiple parallel slots 30 open to the baling chamber 14. As illustrated, the slots 30 extend from a first end 32 (e.g., top end) of the forward plunger 26 to a second end 34 (e.g., bottom end) of the forward plunger 26, and the slots 30 are generally aligned with the vertical axis 24 of the baler 10. The slots 30 are spaced evenly across the material-facing surface 28 of the forward plunger 26. As shown, six slots are provided on the material-facing surface 28 of the forward plunger 26, although two, three, four, five, seven, eight, nine, ten, or more slots may be provided in other embodiments. The forward plunger 26 is configured to move axially within the baling chamber 14 in a reciprocating motion along the longitudinal axis 22 of the baler 10. In other words, the forward plunger 26 is configured to move in a first direction (e.g., forward direction or forwardly) and in a second direction (e.g., rearward direction or rearwardly). In the illustrated embodiment, the forward plunger 26 is coupled to an actuator 36 via one or more arms 38. The actuator 36 may be a hydraulic cylinder or a pneumatic cylinder, or the actuator 36 may include a piston that drives a flywheel to power a gearbox. The gearbox may, in turn, rotate crank arms that are coupled to the arms 38 to facilitate movement of the forward plunger 26. Regardless of its form, the actuator 36 is configured to control the reciprocating motion of the forward plunger 26.

In the illustrated embodiment, the baler 10 includes a rear plunger 40 (e.g., a density control wall) disposed at or near the rear end 18 of the baler 10 and opposite the forward plunger 26. As shown, the rear plunger 40 has a material-facing surface 42 having multiple parallel slots 30 open to the baling chamber 14. The slots 30 extend from a first end 44 (e.g., top end) of the rear plunger 40 to a second end 46 (e.g., bottom end) of the rear plunger 40, and the slots 30 are generally aligned with the vertical axis 24 of the baler 10. The slots 30 are spaced evenly across the material-facing surface 42 of the rear plunger 40. Furthermore, each slot 30 of the rear plunger 40 is disposed opposite (e.g., aligned with) one corresponding slot 30 of the forward plunger 26. In the illustrated embodiment, the rear plunger 40 is configured to control the density of a bale formed within the baling chamber 14 through the use of one or more actuators 48 (e.g., hydraulic cylinder, pneumatic cylinder, etc.), which are coupled to the rear plunger 40 via one or more arms, as described in more detail below.

As shown in FIG. 1, the baling chamber 14 also has a first wall 50 (e.g., a top wall) and a second wall 52 (e.g., a bottom wall) opposite the first wall 50. In the illustrated embodiment, the first wall 50 and the second wall 52 have multiple parallel slots 30 open to the baling chamber 14. The slots 30 disposed within the first wall 50 and the second wall 52 extend along the longitudinal axis 22 of the baler 10 between the forward plunger 26 and the rear plunger 40. The slots 30 disposed within the first wall 50 and the second wall 52 may extend along the length of the baling chamber 14 so as to accommodate the various axial positions of the forward plunger 26 and the rear plunger 40, and to align with the slots 30 of the forward plunger 26 and the rear plunger 40 even as the plungers 26, 40 move axially (e.g., along the longitudinal axis 22) within the baling chamber 14.

Additionally, the slots 30 formed in each of the forward plunger 26, the rear plunger 40, the first wall 50, and the second wall 52 align so as to surround, or substantially surround, the baling chamber 14. More specifically, each of the forward plunger 26, the rear plunger 40, the first wall 50, and the second wall 52 has a first slot 30a that aligns with corresponding slots 30 in the other components to substantially surround the baling chamber 14. As noted above, in some embodiments, two, three, four, five, six, or more slots 30 may be provided in each of the forward plunger 26, the rear plunger 40, the first wall 50, and the second wall 52, and thus, the baling chamber 14 may be surrounded by two, three, four, five, six, or more slots 30. As discussed in more detail below, the slots 30 are aligned to enable a strap to be directed around the baling chamber 14 to strap the compressible material within the baling chamber 14 into a bale.

In the illustrated embodiment, the baler 10 includes a spool 54 configured to store and to provide a strap 56 for strapping the material within the baling chamber 14. In certain embodiments, the spool 54 may be accessible and/or removable to facilitate replacement and/or installation of the strap 56. As illustrated, the spool 54 provides the strap 56 to a strap feeding assembly 58, which is configured to direct and/or to propel the strap 56 around the baling chamber 14. For example, the strap feeding assembly 58 propels the strap 56 through the slots 30 in order to surround the bale with the strap 56. As shown in FIG. 1, the baler 10 also includes a sealing assembly 60, which is configured to receive and/or to capture the strap 56, and to seal one portion of the strap 56 to another portion of the strap 56 to form the strap 56 into a sealed loop around the bale.

In systems having the sealing assembly 60, the slot 30 may be interrupted by the sealing assembly 60. In other words, the slot 30 may substantially surround the baling chamber 14, but the slot 30 may not be present at the location of the sealing assembly 60. For example, as shown in FIG. 1, the sealing assembly 60 is adjacent (e.g., proximal) to the first wall 50, and thus, the slot 30 is not present within the first wall 50 at the location of the sealing assembly 60. In some embodiments, the sealing assembly 60 may align with adjacent portions of the slot 30, enabling the strap 56 to be fed through the sealing assembly 60 and into the adjacent portion of the slot 30 to surround the bale. Additionally, such a configuration enables the strap 56 to be removed from both the sealing assembly 60 and the slots 30 after the strap 56 is sealed around the bale, as described in more detail below.

In certain embodiments, one or more of the spool 54, the strap feeding assembly 58, and the sealing assembly 60 are coupled to the frame 12 of the baler 10. Furthermore, the spool 54, the strap feeding assembly 58, and/or the sealing assembly 60 may be disposed proximal to the first wall 50 of the baling chamber 14. Although one spool 54, one strap feeding assembly 58, and one sealing assembly 60 are shown in FIG. 1 for clarity, it should be understood that multiple sets of these components may be provided within the baler 10 in order to surround the bale with multiple straps 56, in some embodiments. For example, as shown in FIG. 1, the spool 54, the strap feeding assembly 58, and the sealing assembly 60 are aligned with the first slot 30a. However, a separate spool 54, strap feeding assembly 58, and sealing assembly 60 may be provided and aligned with each of the slots 30. Thus, multiple straps 56 may be fed through the slots 30 and sealed around the bale, as described in more detail below.

Additionally, as noted above, although the illustrated embodiments show systems for strapping the bale about the lateral axis 20 of the baler 10, it should be understood that the systems disclosed herein may be readily adapted for strapping the bale about the longitudinal axis 22 or the vertical axis 24. For example, to strap the bale about the vertical axis 24, the slots 30 may extend across the material-facing surface 28 of the forward plunger 26 such that the slots 30 are aligned with the lateral axis 20 of the baler 10 and are parallel to the top end 32 and to the bottom end 34 of the forward plunger 26. Similarly, the slots 30 may extend across the material-facing surface 42 of the rear plunger 40 such that the slots 30 are aligned with the lateral axis 20 of the baler 10 and are parallel to the top end 44 and to the bottom end 46 of the rear plunger 40. In such configurations, the strap 42 may be propelled through the slots 30 laterally 20 across the slots 30 of the forward plunger 26 and the slots 30 of the rear plunger 40. Additionally, in such configurations, rather than slots 30 being formed in the top wall 50 and the bottom wall 52, the slots 30 may extend along a first side wall and a second side wall, opposite the first side wall, of the baling chamber 14 between the forward plunger 26 and the rear plunger 40. The spool 54, the strap feeding assembly 58, and/or the sealing assembly 60 may be disposed on the first side wall of the baling chamber 14, and the needle 52 may be disposed on the second side wall of the baling chamber 14. The components may function together to surround the bale with the strap 42 about the vertical axis 24 of the baler 10.

The strap 56 may be formed from any suitable relatively high-strength material. For example, the strap 56 may have a strength of about 150 kilograms-force (kgf) to about 1500 kgf. In some embodiments, the strap 56 may have a strength of about 300 kgf to about 1200 kgf. The strap 56 may be any suitable width, although the strap 56 may be about 1 centimeter (cm) to about 5 cm wide, in some embodiments. In certain embodiments, the strap 56 may be formed from carbon steel or plastics, such as polypropylene or polyester. In some embodiments, the baler 10 is configured to form bales that are about 2 to about 3 meters long (along the longitudinal axis 22) by about 1 to about 2 meters wide (along the lateral axis 20) by about 0.5 to about 1 meters tall (along the vertical axis 22), and the strap 56 is of a suitable strength to securely strap bales of this size.

Figure 2:
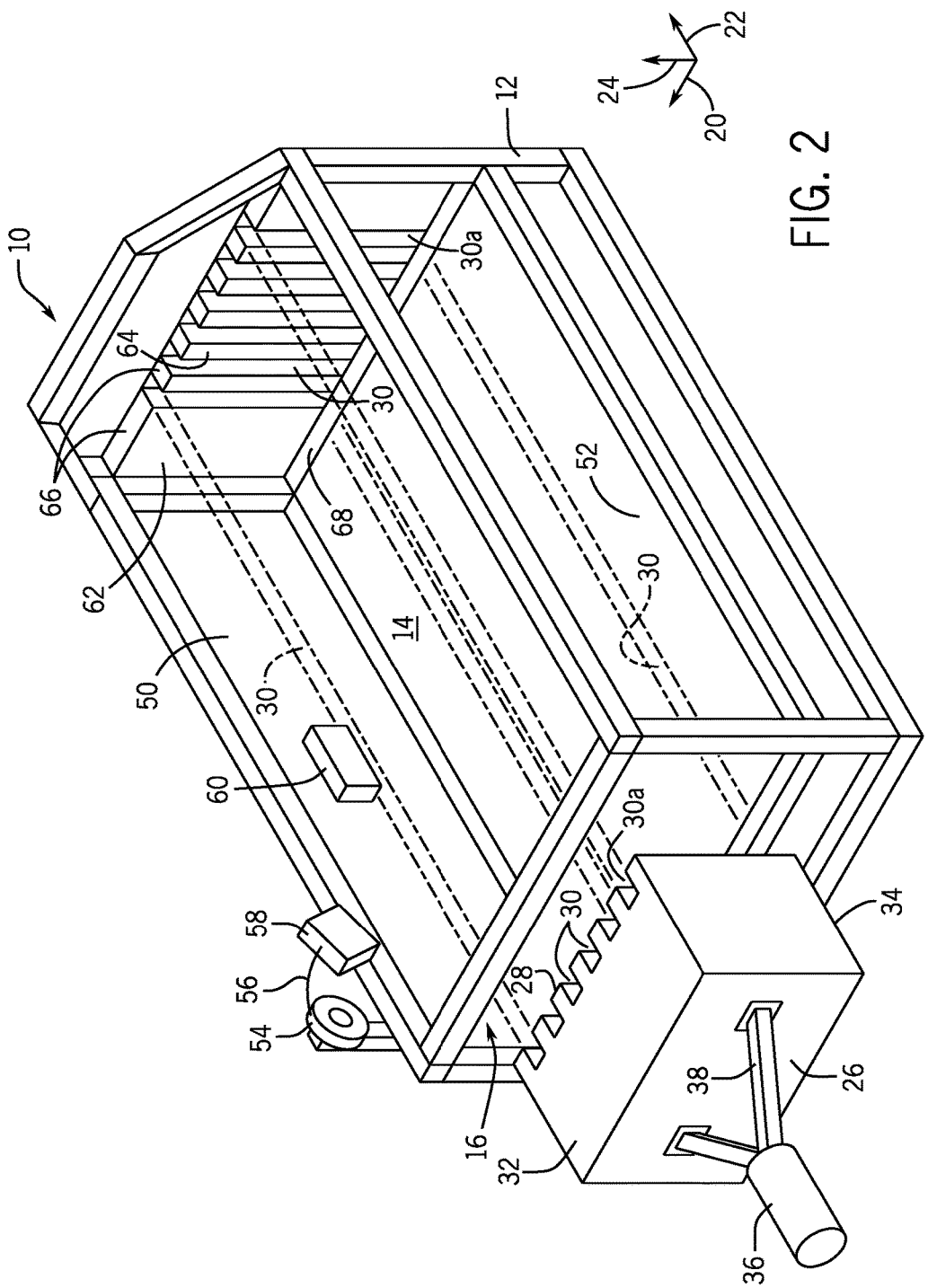
FIG. 2 is a perspective view of another embodiment of a portion of a baler having a forward plunger and a rear wall.

FIG. 2 is a perspective view of another embodiment of a portion of the baler 10 having the forward plunger 26 and a rear wall 62. In certain embodiments, the baler 10 may include a rear wall 62 rather than the rear plunger 40. The rear wall 62 is stationary and includes a material-facing surface 64. In the illustrated embodiment, the material-facing surface 64 includes multiple parallel slots 30 open to the baling chamber 14. The slots 30 extend from a first end 66 (e.g., top end) of the rear wall 62 to a second end 68 (e.g., bottom end) of the rear wall 62, and the slots 30 are generally aligned with the vertical axis 24 of the baler 10. The slots 30 are spaced evenly across the material-facing surface 64 of the rear wall 62. Furthermore, each slot 30 of the rear wall 62 is disposed opposite (e.g., aligned with) one corresponding slot 30 of the forward plunger 26. In the illustrated embodiment, the rear wall 62 is configured to facilitate the collection of material in the baling chamber 14 and to maintain the shape of the bale.

Figure 3:
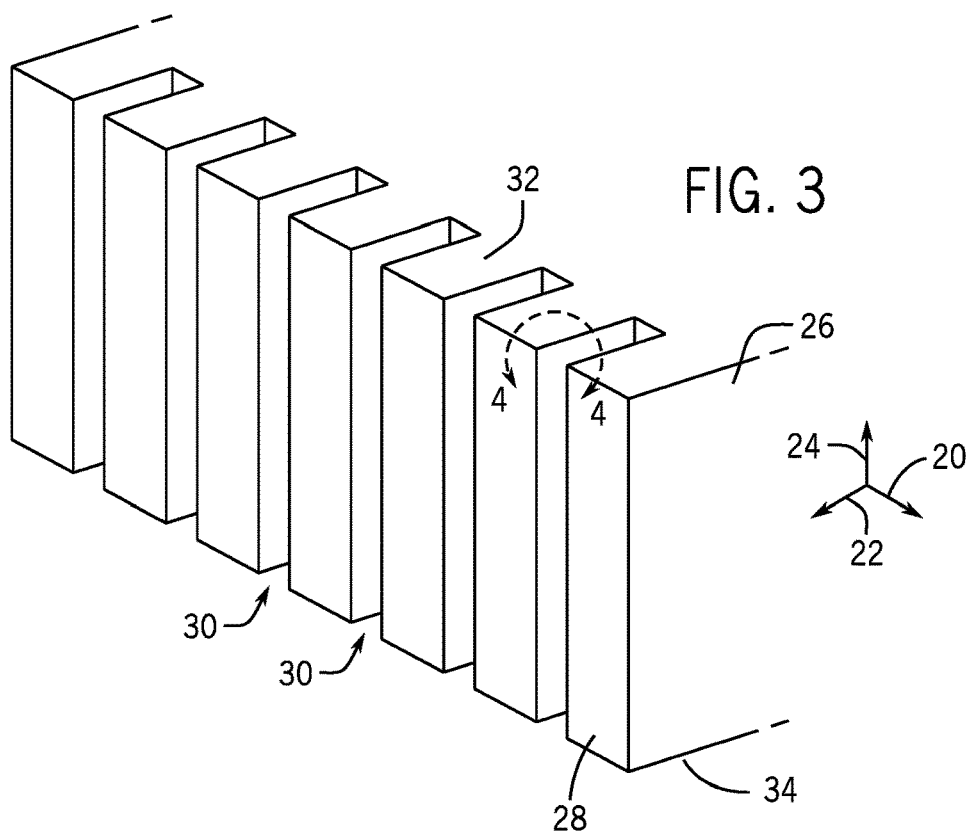
FIG. 3 is a perspective view of an embodiment of a plunger having multiple slots formed on a material-facing surface of the plunger.

FIG. 3 is a perspective view of an embodiment of the forward plunger 26 having multiple slots 30 formed on the material-facing surface 28 of the forward plunger 26. As discussed above, the parallel slots 30 open to the baling chamber 14 extend from the first end 32 (e.g., top end) of the forward plunger 26 to the second end 34 (e.g., bottom end) of the forward plunger 26, and the slots 30 are generally aligned with the vertical axis 24 of the baler 10. The slots 30 are spaced evenly across the material-facing surface 28 of the forward plunger 26, although other spacing may be suitable in some embodiments. As shown, six slots are provided on the material-facing surface 28 of the forward plunger 26, although two, three, four, five, seven, eight, nine, ten, or more slots may be provided in other embodiments. The slots 30 enable the strap 56 to be propelled (e.g., directed) around the baling chamber 14 to facilitate strapping the bale. The slots 30 disposed in the rear plunger 40 and/or the rear wall 62 may have a similar configuration as the slots 30 disposed in the forward plunger 26 shown in FIG. 3.

Figure 4:
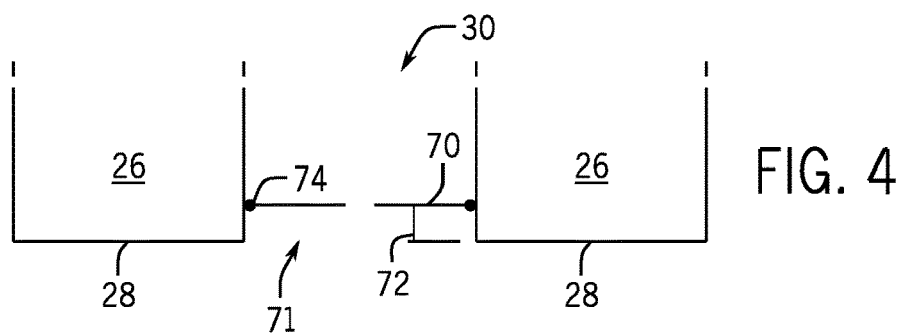
FIG. 4 is a top cross-sectional view of an embodiment of a track assembly having a gate disposed within a slot of a plunger.

FIG. 4 is a cross-sectional view of an embodiment of a track assembly 71 having a gate 70 disposed within the slot 30 of the forward plunger 26. Although the slot 30 having the gate 70 is shown within the forward plunger 26 in FIG. 4, similar gates 70 may be disposed within the slots 30 of the rear plunger 40, the first wall 50, and the second wall 52. In some embodiments, the gates 70 may be recessed a distance 72 within the slot 30 (e.g., from the material-facing surface 28 of the forward plunger 26). Recessing the gate 70 from the material-facing surface 28, for example, may enable the gate 70 to open and close without interference from the material within the baling chamber 14. The gate 70 may generally retain the strap 56 within the slot 30 as the strap 56 travels through the slot 30, as described in more detail below. As shown, the gate 70 is coupled to the slot 30 by one or more hinges 74, which may be spring-loaded, although any suitable mechanism for coupling the gate 70 to the slot 30 is contemplated. In such configurations, after the strap 56 is fed through the slots 30 around the baling chamber 14, the gate 70 releases the strap 56 from the slots 30 when a force is applied to the gate 70 by the strap 56. For example, the gates 70 may release the strap 56 when the strap 56 is pulled tightly around the bale (e.g., by the strap feeding assembly 58 or the sealing assembly 60). In some embodiments, the gate 70 may be actuated, and the gate 70 may be configured to open at a certain time (e.g., after the strap 56 is fed through the slots 30 and surrounds the bale within the baling chamber 14).

Figure 5:
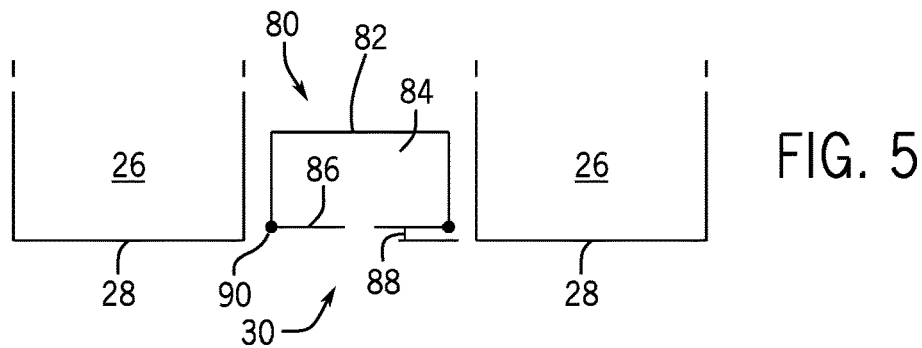
FIG. 5 is a top cross-sectional view of another embodiment of a track assembly disposed within a slot of a plunger.

FIG. 5 is a cross-sectional view of another embodiment of a self-contained track assembly 80 disposed within the slot 30. In certain bale press systems 10, it may be desirable to provide the track assembly 80 within each slot 30 to receive and to direct the strap 56 through the slot 30 and around the baling chamber 14. For example, the track assembly 80 may be formed from materials (e.g., high-strength materials) that may be configured to reduce wear from the movement of the straps 56 through the track assembly 80. The track assembly 80 may also be repaired or replaced should a portion of the track assembly 80 become worn over time, without the need to replace the plungers 26, 40 or the walls 50, 52, for example. In the illustrated embodiment, the track assembly 80 is coupled to the slot 30, and thus, the slot 30 supports the track assembly 80. In certain embodiments, the track assembly 80 extends from the first end 32 to the second end 34 of the forward plunger 26, from the first end 44 to the second end 46 of the rear plunger 40, and along the length of the slots 30 formed within the first wall 50 and second wall 52. Again, although the slot 30 is shown within the forward plunger 26 in FIG. 5, similar track assemblies 80 may be disposed within the slots 30 of the rear plunger 40, the first wall 50, and the second wall 52.

As shown in FIG. 5, the track assembly 80 also includes walls 82 defining a channel 84 through which the strap 56 may travel. The track assembly 80 also has a gate 86 (e.g., the track assembly 80 may include a gated channel 84). Similar to the gate 70 described above with respect to FIG. 4, the gate 86 is configured to retain the strap 56 within the channel 84 as the strap 56 is propelled through the channel 84. In some embodiments, the gates 86 may be recessed a distance 88 within the slot 30 (e.g., from the material-facing surface 28 of the forward plunger 26). Recessing the gate 86 from the material-facing surface 28, for example, may enable the gate 86 to open and close without interference from the material within the baling chamber 14. As shown, the gate 86 is coupled to the walls 82 by one or more hinges 90, which may be spring-loaded. In such cases, after the strap 56 is fed through the channel 84 around the baling chamber 14, the gate 86 releases the strap 56 from the channel 84 when a force is applied to the gate 90 by the strap 56. For example, the gates 86 may release the strap 56 when the strap 56 is pulled tightly around the bale (e.g., by the strap feeding assembly 58 or the sealing assembly 60). In some embodiments, the gate 86 may be actuated, and the gate 86 may be configured to open at a certain time (e.g., after the strap 56 is fed through the channel 84 and surrounds the bale within the baling chamber 14).

Figure 6:
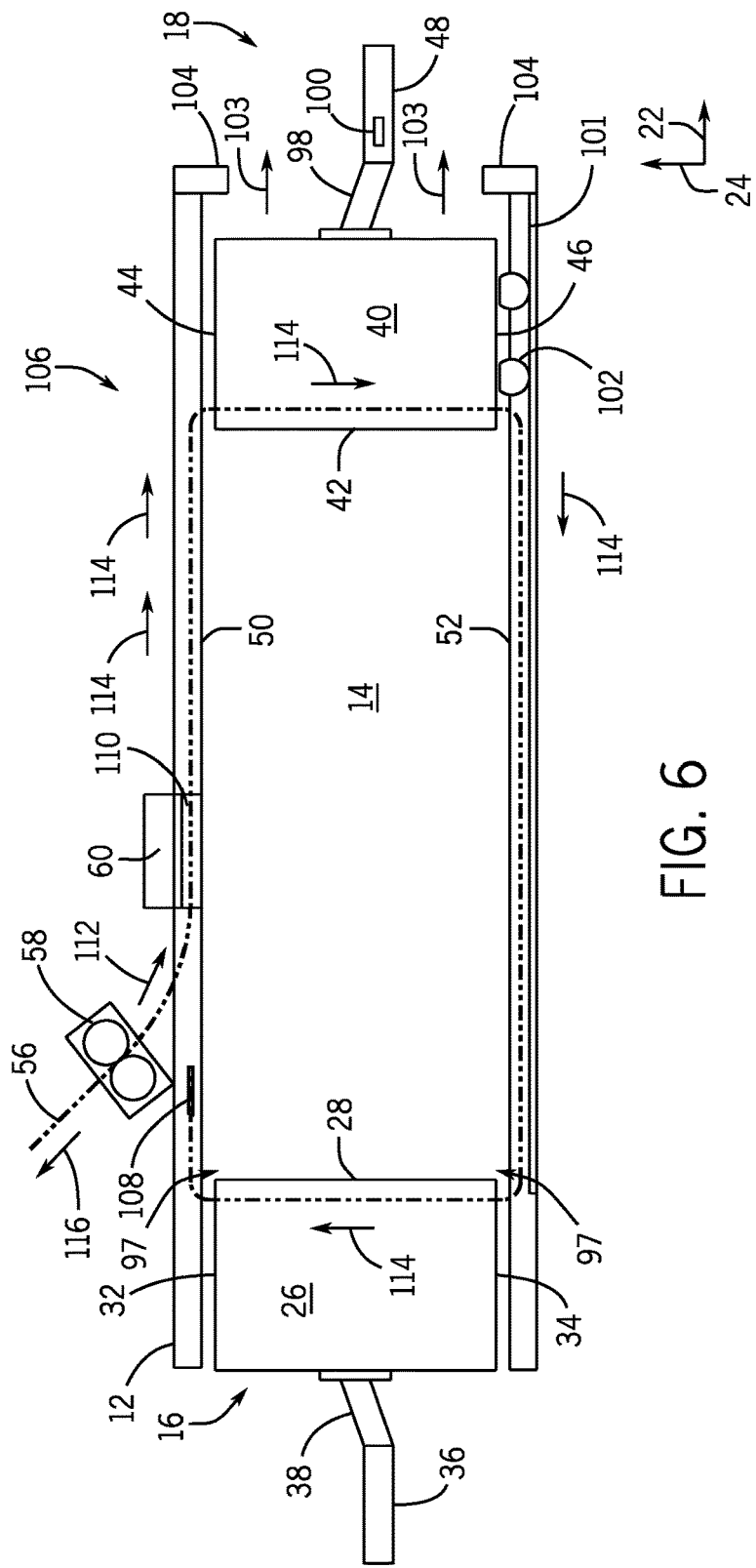
FIG. 6 is a side cross-sectional view of an embodiment of a baling chamber having a track assembly disposed around the baling chamber and a strap feeding assembly disposed forwardly of a sealing assembly.

FIG. 6 is a side cross-sectional view of an embodiment of the baling chamber 14 having the track assembly 80 disposed around the baling chamber 14 and a strap feeding assembly 58 disposed forward of a sealing assembly 60. The forward plunger 26 is disposed at the forward end 16 of the baling chamber 14, while the rear plunger 40 is disposed at the rear end 18 of the baling chamber 14, opposite the forward plunger 26. The first wall 50 and the second wall 52 opposing the first wall 50 extend between the forward plunger 26 and the rear plunger 40 along the longitudinal axis 22 of the baling chamber 14. One or more dogs 97 are provided to support the material within the baling chamber 14. The dogs 97 generally retain the material within the baling chamber 14 as the forward plunger 26 moves forwardly. The dogs 97 may be spring-loaded so as to collapse as the forward plunger 26 moves rearwardly into the baling chamber 14, passing over the dogs 97. The dogs 97 may release or move into the baling chamber 14 as the forward plunger 26 moves forwardly out of the baling chamber 14.

In operation, the compressible material enters the baling chamber 14 through the forward end 16. The forward plunger 26 then moves axially (e.g., along the longitudinal axis 22) within the baling chamber 14 to urge the compressible material rearwardly, thereby compressing the material against the rear plunger 40. In certain embodiments, the rear plunger 40 is adjustable and pressure-controlled, and is configured to generally control the size and/or density of the bale formed in the baling chamber 14. In the illustrated embodiment, the rear plunger 40 is configured to control the density of the bale via the actuator 48 (e.g., hydraulic cylinder, pneumatic cylinder, etc.), which is coupled to the rear plunger 40 by an arm 98. In some embodiments, the desired density of the bale may be achieved by setting a relief valve 100 to a preset threshold pressure that corresponds to the desired density of the bale, for example. After the desired density is achieved, the baler 10 may automatically initiate the strapping process in which the strap feeding assembly 58 propels the strap 56 into the slots 30 to surround the bale.

In certain embodiments, the rear plunger 40 may be positioned proximate to (e.g., near) the forward plunger 26 prior to the formation of the bale and in preparation for receiving material into the baling chamber 14. For example, the rear plunger 40 may move toward the forward plunger 26 along a path 101, which is configured to facilitate movement of the rear plunger 40 within the baling chamber 14. In certain embodiments, the path 101 may coincide with the slot 30 or the track assembly 71, 80. The rear plunger 40 may have rollers 102 configured to enable the rear plunger 40 to move (e.g., roll) along the path 101 within the baling chamber 14. Material may flow into the baling chamber 14 and may be urged rearwardly toward and against the rear plunger 40 by the forward plunger 26.

In some embodiments, when the force applied by the material within the baling chamber 14 against the rear plunger 40 exceeds the preset threshold pressure established by the relief valve 100, the actuator 48 enables the rear plunger 40 to move rearwardly as indicated by arrows 102. This results in establishing the desired density of the bale. In the illustrated embodiment, a stop 104 is provided to block the rearward movement of the rear plunger 40, thereby limiting the size of the bale. The stop 104 may be adjustable to enable the formation of bales of varying lengths. For example, the stop 104 may be mechanically and/or electronically adjusted by a control system of the baler 10. In such a configuration, an operator may adjust the position of the stop 104 (and thus the length of the bales) by inputting a desired bale length into the control system, for example. Although shown as a mechanical stop 104 that physically blocks rearward movement of the rear plunger 40, any other suitable mechanism for limiting the rearward movement of the rear plunger and controlling the size of the bale is envisioned. In such configurations, the strapping process may begin after the rear plunger 40 reaches the stop 104. In some embodiments, the strapping process may begin automatically when the rear plunger reaches the stop 104. Additionally, a sensor (or a series of sensors) may be disposed within the bale press system 10, or the stop 104 may include or form the sensor, to facilitate deactivation of the forward plunger 26 when the rear plunger 40 reaches the stop 104, thereby establishing the desired size of the bale.

In certain embodiments, the rear plunger 40 may be coupled to a large force hydraulic cylinder that enables the baler 10 to generate relatively higher density bales. In such configurations, once the rear plunger 40 is against the stop 104, the forward plunger 26 stops movement in the rearward direction. Then the rear plunger 40 is urged forward toward the forward plunger 26 via the large force hydraulic cylinder to further compress the bale and to achieve a higher density/smaller bale. For example, the stop 104 may be set so that the rear plunger 40 is moved rearwardly to generate a 10 foot bale. Once the length of 10 feet is achieved, the forward plunger 26 stops and the rear plunger 40 then moves forward (e.g., one foot, two feet, three feet, or more) via the large force hydraulic cylinder to shorten the length (e.g., the length of the bale in the direction of the longitudinal axis 22) of the bale within the baling chamber 14, thus creating a more dense/smaller bale.

As discussed above, the baler 10 includes various components configured to facilitate strapping the compressible material within the baling chamber 14. Such components include the strap feeding assembly 58 and the sealing assembly 60, for example. These components may be placed at various positions relative to the baling chamber 14 and relative to one another. For example, as shown in FIG. 6, both the strap feeding assembly 58 and the sealing assembly 60 are disposed on a first side 106 of the baling chamber 14 (e.g., proximal to the first wall 50, above the baling chamber 14, etc.). As shown in FIG. 6, the strap feeding assembly 58 is disposed forward of the sealing assembly 60 (e.g., the strap assembly 58 is proximal to the forward end 16 of the baling chamber 14, and the sealing assembly 60 is distal from the forward end 16). In such a configuration, the strap feeding assembly 58 feeds (e.g., directs, propels, etc.) an end 108 of the strap 56 into a mandrel 110 of the sealing assembly 60 as shown by arrow 112. From the sealing assembly 60, the end 108 of the strap 56 is directed into the slot 30 (or the track assembly 80 disposed within the slot 30) of the first wall 50. Once within the slot 30, the end 108 of the strap 56 is propelled toward the rear plunger 40 disposed at the rear end 18 of the baling chamber 14 as shown by arrows 114. The end 108 of the strap 56 then travels through the aligned slot 30 of the rear plunger 40, the second wall 52, and the forward plunger 26. After travelling around the baling chamber 14, the end 108 of the strap 56 is directed again into the mandrel 110 of the sealing assembly 60. In some embodiments, the sealing assembly 60 may include a sensor and a gripper, and when the sensor senses the presence of the strap 56, the gripper may grip or capture the strap 56. Once the end 108 of the strap 56 is received, the sealing assembly 60 may seal the end 108 of the strap 56 to a portion of the strap 56 disposed within the sealing assembly 60 to form the strap 56 into a closed loop around the bale within the baling chamber 14. The sealing assembly 60 may use any suitable technique for sealing the strap 56, such as friction welding. Additionally, in certain embodiments, the strap feeding assembly 58 is configured to pull on (e.g., retract) the strap 56 in the direction of arrow 116 until a certain (e.g., preset) tension is achieved prior to the strap 56 being sealed. In some embodiments, the sealing assembly 60 may also cut the strap 56 in preparation for strapping another bale.

Figure 7:
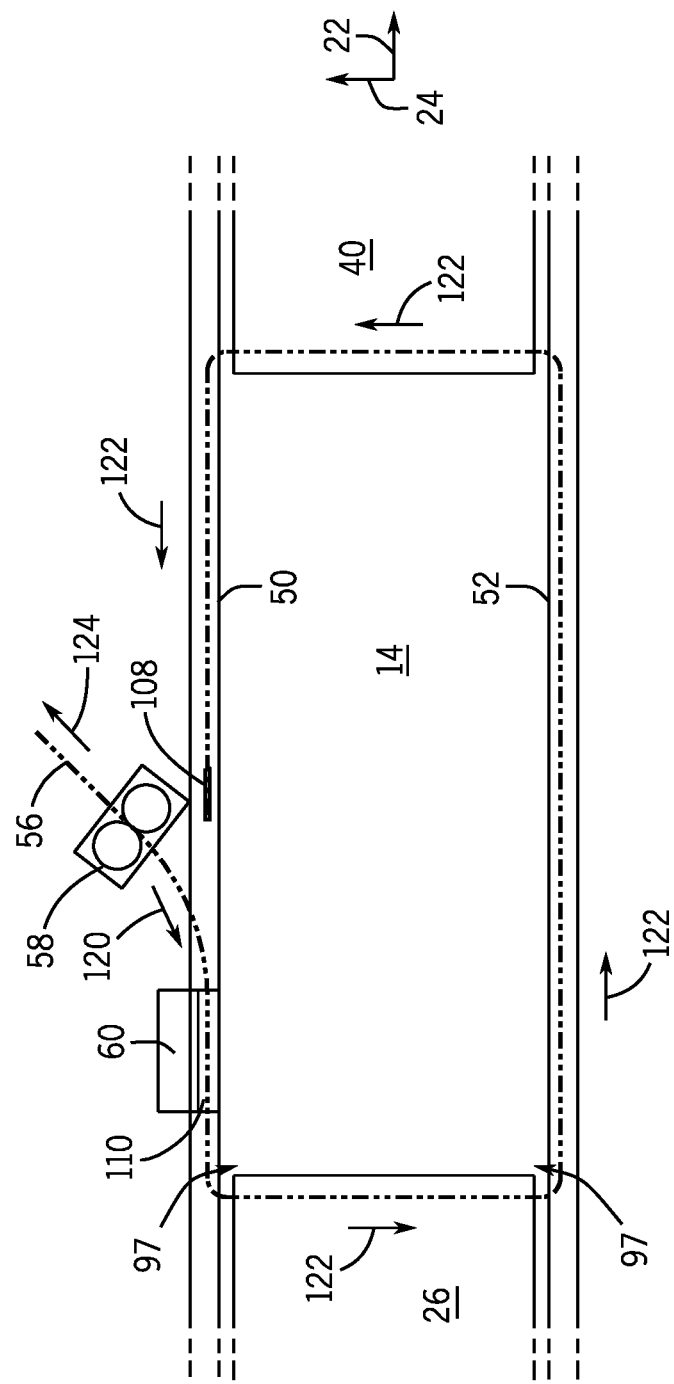
FIG. 7 is a side cross-sectional view of another embodiment of a baling chamber having a track assembly disposed around the baling chamber and a strap feeding assembly disposed rearwardly of the sealing assembly.

However, in certain embodiments, it may be desirable to provide the strap feeding assembly 58 rearward of the sealing assembly 60 (e.g., the strap assembly 58 is proximal to the rear end 18 of the baling chamber 14, and the sealing assembly 60 is distal from the rear end 18). Accordingly, FIG. 7 is a side cross-sectional view of an embodiment of the baling chamber 14 having the track assembly 80 disposed around the baling chamber 14 and the strap feeding assembly 58 disposed rearwardly of the sealing assembly 60. In such a configuration, the strap feeding assembly 58 feeds the end 108 of the strap 56 in a generally forward direction as shown by arrow 120 into the mandrel 110 of the sealing assembly 60. From the sealing assembly 60, the end 108 of the strap 56 is directed into the slot 30 (or the track assembly 80 within the slot 30) of the first wall 50 or directly into the slot 30 of the forward plunger 26, depending on the relative location of the sealing assembly 60. Once within the slot 30, the end 108 of the strap 56 is propelled through the slots 30 of the forward plunger 26, the second wall 52, the rear plunger 40, and the first wall 50 as shown by arrows 122. After travelling around the baling chamber 14, the end 108 of the strap 56 is directed again into the mandrel 110 of the sealing assembly. As noted above, in some embodiments, the sealing assembly 60 may include a sensor and a gripper, and when the sensor senses the presence of the strap 56, the gripper grips or captures the strap 56. Once the end 108 of the strap 56 is received, the sealing assembly 60 may seal the end 108 of the strap 56 to a portion of the strap 56 disposed within the sealing assembly 60 to form the strap 56 into a closed loop around the bale within the baling chamber 14. Additionally, in certain embodiments, the strap feeding assembly 58 is configured to pull on (e.g., retract) the strap 56 as shown by arrow 124 until a certain (e.g., preset) tension is achieved prior to the strap 56 being sealed. In some embodiments, the sealing assembly 60 may also cut the strap 56 in preparation for strapping another bale.

After the strap 56 is sealed around the bale, the bale is removed (e.g., moved, ejected, dropped) from the bale chamber 14. Any suitable mechanism for removing the bale is envisioned. Additionally, the ejection systems and methods described herein may be utilized in conjunction with a variety of containment systems and methods, in addition to the systems for strapping the bale described above. For example, the ejection systems may be used with alternative strapping systems, twine knotting systems, or other containment systems. Furthermore, the ejection systems may be used to remove bales that are surrounded by straps 56, twine, or other materials.

FIG. 8 is a perspective view of an embodiment of the baler 10 having an ejection system 130. As shown, the bale ejection system 130 includes a hinge 132 proximate to the forward end 16 of the baling chamber 14. The hinge 132 is coupled to the frame 12 and to the second wall 52. Accordingly, the second wall 52 is hinged at the first end 16 of the baling chamber 14. The second wall 52 pivots (e.g., rotates) about the hinge 132 and about a pivot axis 133, which extends through the hinge 132 and may be parallel to the lateral axis 20. The movement of the second wall 52 facilitates removal (e.g., ejection) of the bale from the baling chamber 14.

FIG. 9 is a side cross-sectional view of an embodiment of the baler 10 having the ejection system 130, in which the second wall 52 is movable (e.g., pivotable, rotatable, etc.) from a first position 134 to a second position 136. For example, the second wall 52 of the baling chamber 14 may be configured to pivot (e.g., rotate) about the hinge 132 in the direction 138 from the first position 134 (e.g., a generally horizontal position) to the second position 136 (e.g., a generally downwardly inclined position). In the first position 134, the second wall 52 supports the bale. Orienting the second wall 52 in the second position 136 enables the bale to move (e.g., slide, descend, etc.) downwardly along the second wall 52 in a direction 139 until the bale exits the baling chamber 14. The angle of rotation of the second wall 52 about the hinge 132 may vary, although in some embodiments, the second wall 52 may rotate such that an opening 140 formed at the second end 18 of the baler 10 has a length 143 along the vertical axis 24 of between about 0.5 meters to about 2 meters. Additionally, the second wall 52 may rotate so that the bale freely and/or readily moves (e.g., slides) out of the baling chamber 14 without being driven in the direction 139 (e.g., without application of a force having components along the longitudinal axis 22 and/or along the vertical axis 22).

However, in certain embodiments, a conveyor 141 (e.g., belt, track, chain, etc.) is disposed on the bottom wall 52 to facilitate removal of the bale from the baling chamber. The conveyor 141 may have a textured surface 142 (e.g., protrusions, dogs, etc.) configured to engage the bale and to facilitate removal of the bale from the baling chamber 14. During or after movement of the bottom wall 52 to the second position 134, the conveyor 141 may urge the bale toward the second end 143 of the bottom wall 52, thereby pulling the bale out of the baling chamber 14 in the direction 139.

Additionally, the second wall 52 of the baler 10 may be configured to automatically pivot about the hinge 132 after the bale is strapped (e.g., after the strap 56 is sealed around the bale by the sealing assembly 60). For example, a control system may direct the second wall 52 to pivot about the hinge 132 after the bale is strapped. In other embodiments, the second wall 52 may be configured to pivot about the hinge 132 in response to an input (e.g., an operator input).

FIG. 10 is a side cross-sectional view of an embodiment of the baler 10 including the ejection system 130. As shown, the ejection system 130 includes a cam 145, or cam-like mechanism, configured to move a first side wall 148 and/or a second side wall 150 outwardly from the baling chamber 14. In certain embodiments, the first side wall 146 and/or the second side wall 148 are movable, and each side wall 148, 150 is coupled to one or more cams 145 (e.g., a first cam 145a is coupled to the first side wall 146 and/or a second cam 145b is coupled to the second side wall 148). However, it should be appreciated that other components for moving the first side wall 146 and/or the second side wall 148 may be utilized in alternative embodiments. For example, in some embodiments, the first side wall 146 and/or the second side wall 148 may be coupled to an actuator (e.g., a hydraulic cylinder, a pneumatic cylinder, etc.) configured to drive the respective side wall 146, 148 outwardly from the baling chamber 14.

As shown in FIG. 10, the cam 145 is configured to facilitate movement of the first side wall 146 and/or the second side wall 148 away from the baling chamber 14 (and/or away from the second wall 52 and/or away from the bale within the baling chamber 14). The cam 145 is configured to rotate, and a rotation of the cam 145 drives the side walls 146, 148 away from the baling chamber 14. The cam 145 may be driven to rotate by an actuator (e.g., a hydraulic cylinder, pneumatic cylinder, or mechanical linkage).

In certain embodiments, the cam 145 may drive the first side wall 146 and/or the second side wall 148 to move outwardly from the baling chamber 14 along the lateral axis 20. In certain embodiments, the first side wall 146 and/or the second side wall 148 move vertically away from the baling chamber 14 along the vertical axis 24. In other embodiments, the first side wall 146 and/or the second side wall 148 move laterally and vertically (e.g., movement of the first side wall 146 and/or the second side wall 148 may have a component in the lateral direction 20 and the vertical direction 24) away from the baling chamber 14.

Generally, moving the first side wall 146 and/or the second side wall 148 away from the baling chamber 14 enables the bale to move out of the baling chamber 14. For example, the first side wall 146 and/or the second side wall 148 support at least a portion of the bale within the baling chamber 14 (e.g., via frictional support or contact). Accordingly, moving the side walls 146, 128 away from the baling chamber 14 reduces friction on the bale and enables the bale to slide along the downwardly inclined second wall 52 out of the baling chamber 14.

Additionally or alternatively, moving the first side wall 146 and/or the second side wall 148 away from the baling chamber 14 enables the second wall 52 to rotate about the hinge 132, thereby enabling the bale to be removed. For example, the first side wall 146 and/or the second side wall 148 may support the second wall 52 (e.g., via a latching mechanism or support structure that couples the side walls 146, 148 to the second wall 52). Accordingly, moving the first side wall 146 and/or the second side wall 148 away from the baling chamber 14 releases the support provided by the side walls 146, 148 and enables the second wall 52 to rotate about the hinge 132. In the depicted embodiment, the cams 145 are configured to move the first side wall 146 and the second side wall 148 in opposite directions along the lateral axis 20, thereby driving the side walls 146, 148 away from the baling chamber 14 as shown by arrows 152. In some embodiments, the first side wall 146 and the second side wall 148 are moved simultaneously.

Figure 11:
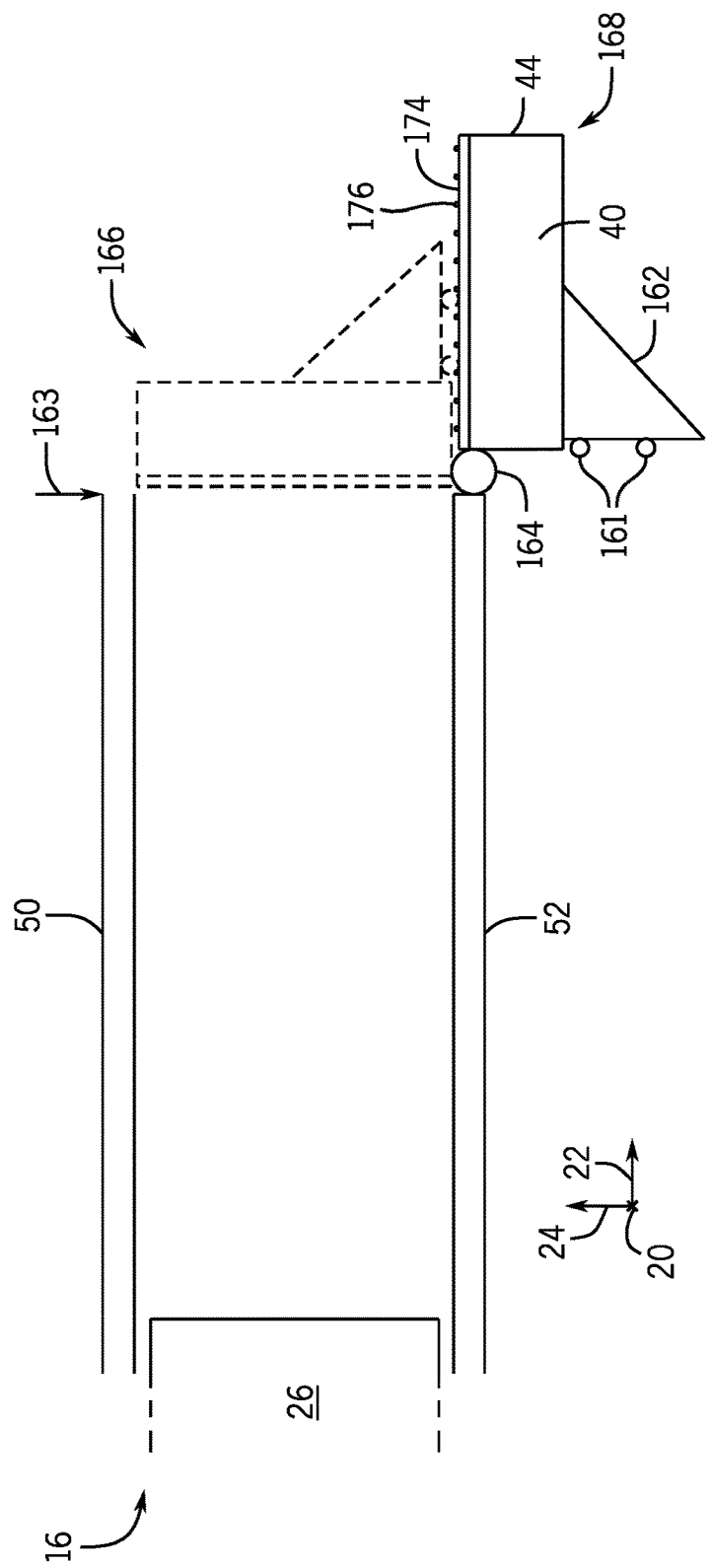
FIG. 11 is a side cross-sectional view of an alternative embodiment of a baler having an ejection system.

FIG. 11 is a side cross-sectional view of an embodiment of the baler 10 having an ejection system 160. As described above with respect to FIG. 6, the rear plunger 40 may be configured to move within the baling chamber 14 to control the size and/or density of the bale. The rear plunger 40 may move rearwardly to an end position 162, which may be reached when the rear plunger 40 contacts the stop 104 or another particular or preset location relative to the baling chamber 14. After the rear plunger 40 reaches the end position 162, if the bale is not already contained, the bale may then be contained via any suitable mechanism, such as the strapping system described above. The ejection system 160 may then remove the contained (e.g., strapped) bale from the baling chamber 14. As shown, the rear plunger 40 pivots about a hinge 164 from a first position 166 (e.g., a generally vertical first position) to a second position 168 (e.g., a generally horizontal second position). In the first position 166, the rear plunger 40 may support the bale within the baling chamber 14, and in the second position 168, the rear plunger 40 may enable removal of the bale from the baling chamber 14. The rear plunger 40 may be rotated via any suitable mechanism. For example, the rear plunger 40 may be coupled to an actuator configured to rotate the rear plunger 40 about the hinge 164 from the first position 166 to the second position 168.

Additionally, as described above with respect to FIGS. 8-10, the rear plunger 40 may be configured to automatically pivot about the hinge 164 after the bale is contained (e.g., after the strap 56 is sealed around the bale by the sealing assembly 60). For example, a control system may direct the rear plunger 40 to pivot about the hinge 164 after the bale is strapped. In other embodiments, the rear plunger 40 may be configured to pivot about the hinge 164 in response to an input (e.g., an operator input).

Figure 12:
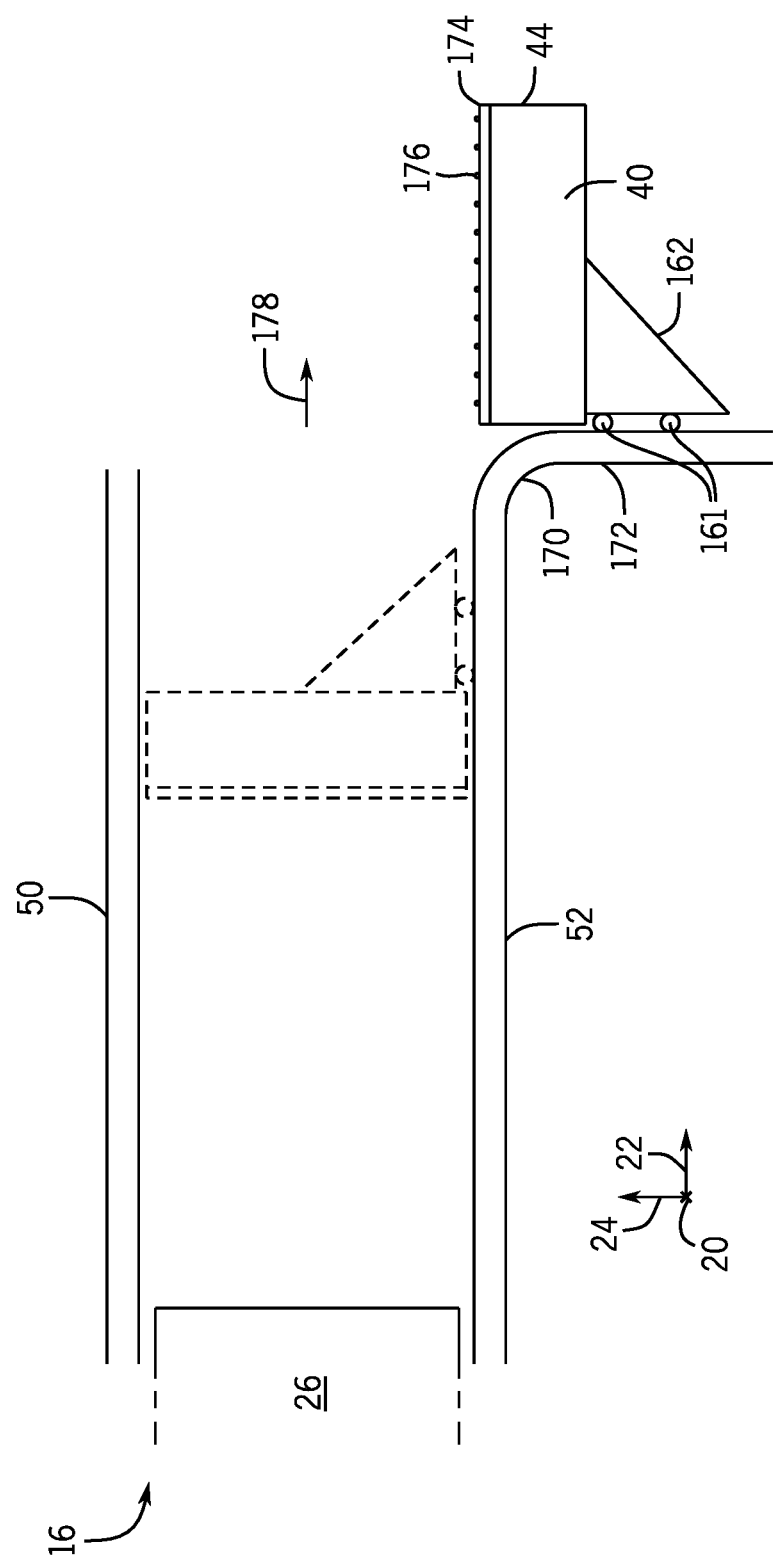
FIG. 12 is a side cross-sectional view of another embodiment of a baler having an ejection system.

FIG. 12 is a side cross-sectional view of another embodiment of the baler 10 having an ejection system 160. In the illustrated embodiment, the rear plunger 40 is configured to move (e.g., roll, travel, etc.) along the path 101 from the first position 166 to the second position 168. The path 101 may be curved or may transition from a generally horizontal portion 170 to a generally vertical portion 172. Thus, when the rear plunger 40 reaches the end position 162, the rear plunger 40 follows the path 101 and rotates (e.g., turns) away from the baling chamber 14, thereby enabling the bale to exit the baling chamber 14.

As shown in FIGS. 11 and 12, the material-facing surface 42 of the rear plunger 40, may be configured to facilitate removal of the bale. In certain embodiments, a conveyor 174 (e.g., belt, track, chain, etc.) is disposed on the material-facing surface 42 of the rear plunger 40. The conveyor 174 may have a textured surface 176 (e.g., protrusions, dogs, etc.) configured to engage the bale and to facilitate removal of the bale from the baling chamber 14. During or after movement of the rear plunger 40 to the second position 168, the conveyor 170 may urge the bale toward the first end 44 of the rear plunger 40, thereby pulling the bale rearwardly out of the baling chamber 14 as shown by arrow 178.

In balers 10 having one or more stops 104 configured to control the size of the bale, the stops 104 may be configured to retract. Thus, the rear plunger 40 may move rearwardly past the stops 104 after the bale is contained, and the rear plunger 40 may pivot about the hinge 164 or move along the path 101, thereby enabling the bale to move out of the baling chamber 14. Alternatively, the stops 104 may not be mechanical stops 104 and/or may be configured to facilitate rotation of the rear plunger 40 about the hinge 164 or the travel along the path 101.

In balers 10 having the ejection system 160 depicted in FIGS. 11 and 12, it may be desirable to have a non-continuous flow of material into the baler 10. For example, the flow of material into the baling chamber 14 may be stopped as the rear plunger 40 pivots and the bale moves out of the baling chamber 14, thereby preventing the material (e.g., loose material that has not been compressed into the bale) from exiting the baling chamber 14 while the rear plunger 40 is in the second position.

Figure 13:
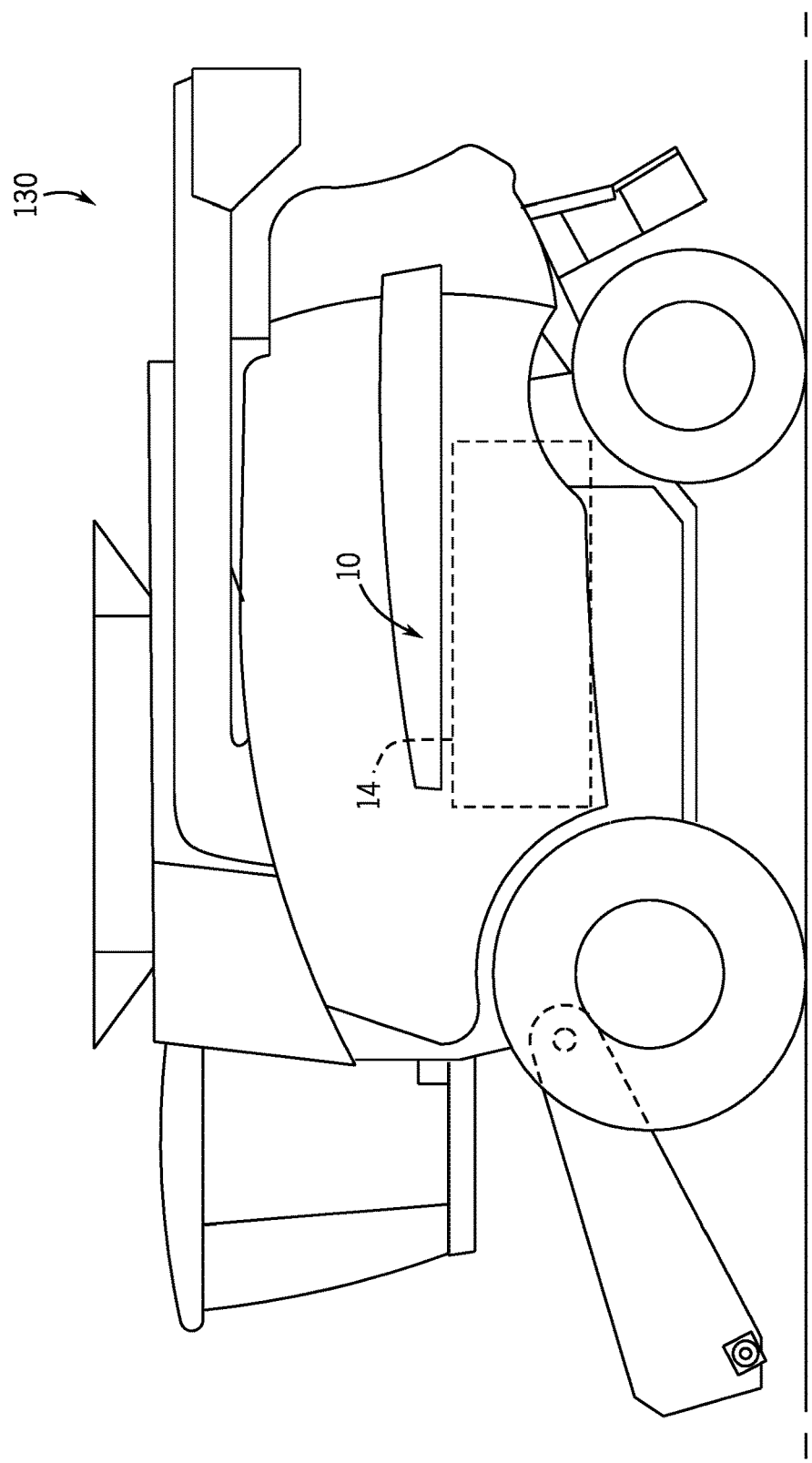
FIG. 13 is a side view of an embodiment of a self-contained vehicle including a baler.

FIG. 13 is a side view of an embodiment of a self-contained vehicle 190 including the baler 10. As illustrated, the baling chamber 14 is supported and/or mounted within or on the self-contained vehicle 190. The material may flow into the baling chamber 14 via a conveyance system, where the material is baled in a manner described above. Thus, the baler 10 may be configured to collect and bale material as the self-contained vehicle 130 travels through the field.

Figure 14:
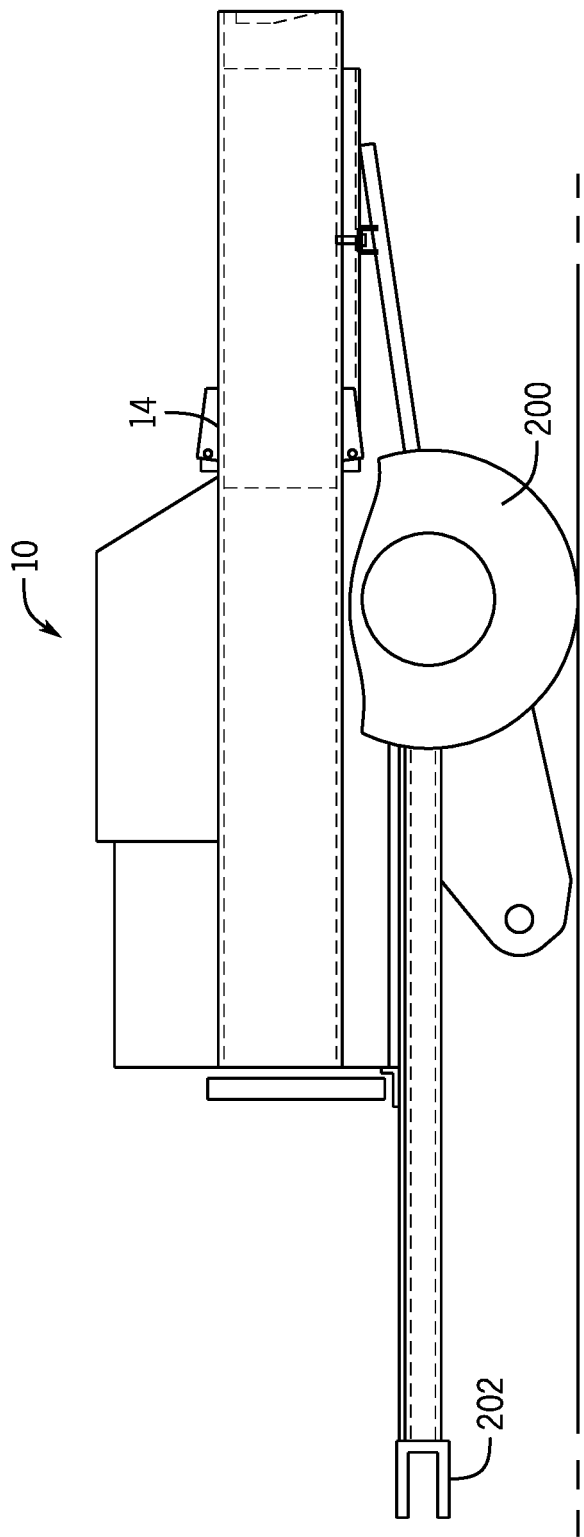
FIG. 14 is a side view of an embodiment of a towed implement having a baler.

FIG. 14 is a side view of an embodiment of a towed implement having the baler 10. As shown, the baler 10 includes a baling chamber 14. The baler 10 may be ground-supported by wheels 200 and may be coupled to a tow vehicle (e.g., a harvester, a tractor, etc.) by a projection 202 that is configured to connect the baler 10 to the tow vehicle. Thus, the baler 10 may be part of the towed implement and pulled through a field. In such a configuration, the baler 10 collects and bales material as the baler 10 travels through the field behind the tow vehicle.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An agricultural baler comprising:
   a baling chamber configured to receive a compressible material, the baling chamber comprising a first wall and a second wall, the first wall opposing the second wall, each of the first wall and the second wall comprising a slot extending along a length of the baling chamber;

a first plunger moveable within the baling chamber, the first plunger configured to compress the compressible material into a bale;

a second plunger opposing the first plunger, the second plunger comprising a second surface opposing the first plunger, the second plunger coupled to an actuator that enables the second plunger to move in a second direction while a force applied by the compressible material against the second plunger exceeds a threshold value, the second surface configured to support the compressible material within the baling chamber, each of the first plunger and the second surface comprising a slot aligned with the slots of the first wall and the second wall; and a track assembly comprising a gated channel, the track assembly disposed within the slots of the first wall, the second wall, the first plunger, and the second surface such that the track assembly surrounds the baling chamber, wherein the agricultural baler is disposed on a movable agricultural implement.

2. The agricultural baler of claim 1, further comprising a mechanical stop configured to limit movement of the second plunger in the second direction to control a size of the bale.

3. The agricultural baler of claim 2, further comprising a sensor configured to detect the presence of the second plunger against the mechanical stop, wherein the first plunger is deactivated when the sensor detects the presence of the second plunger against the mechanical stop.

4. The agricultural baler of claim 1, further comprising a strap feeding assembly configured to propel a strap through the gated channel of the track assembly.

5. The agricultural baler of claim 4, further comprising a sealing assembly configured to receive the strap and to seal an end of the strap to a portion of the strap to form the strap into a loop surrounding the bale within the baling chamber.

6. The agricultural baler of claim 1, wherein the agricultural implement is a self-propelled vehicle.

* * * * *